United States Patent Office 3,445,462
Patented May 20, 1969

3,445,462
16α,17α-CYCLIC ACETALS OF 6-HALO Δ⁴-PREGNENE-16α,17α-DIOL-3,20-DIONE
Howard J. Ringold and George Rosenkranz, Mexico City, Mexico, assignors, by mesne assignments, to Syntex Corporation, a corporation of Panama
No Drawing. Continuation-in-part of application Ser. No. 56, Jan. 4, 1960. This application May 4, 1960, Ser. No. 26,708
Claims priority, application Mexico, June 24, 1959, 55,013
Int. Cl. C07c *173/00, 169/34;* A61k *27/00*
U.S. Cl. 260—239.55                              36 Claims This application is a continuation-in-part of our copending application Ser. No. 56 filed on Jan. 4, 1960, now abandoned which in turn is a continuation-in-part of our copending application, Ser. No. 807,774, filed on Apr. 21, 1959 now abandoned.

The present invention relates to novel cyclopentanophenanthrene compounds.

More particularly, the invention relates to 16α,17α-cyclic acetals and 16α,17α-cyclic ketals of Δ⁴-pregnene-16α,17α-diol-3,20-dione, halogenated at C–6 with a chlorine, bromine or fluorine atom and which may also have an additional double bond between C–1 and C–2 and/or between C–6 and C–7.

The novel compounds of the present invention are illustrated by the following formulas:

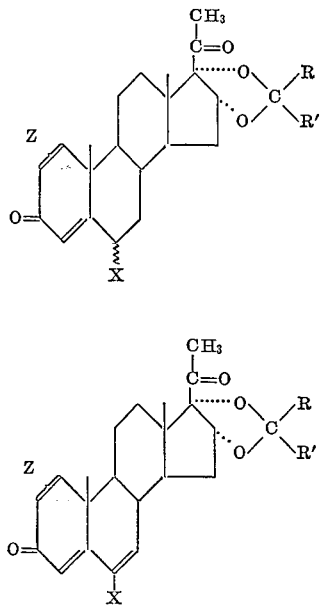

In the above formulas, Z indicates a double bond between C–1 and C–2 or a saturated linkage between C–1 and C–2; X represents chlorine, bromine or fluorine; and R and R' each represent hydrogen or the residue of a hydrocarbon radical containing up to 8 carbon atoms of straight, branched, cyclic or mixed aliphatic-cyclic chain, saturated or unsaturated, and including aromatic groups.

The novel compounds of the present invention are potent progestational agents which have antiestrogenic activity and are prepared by a process illustrated by the following equation:

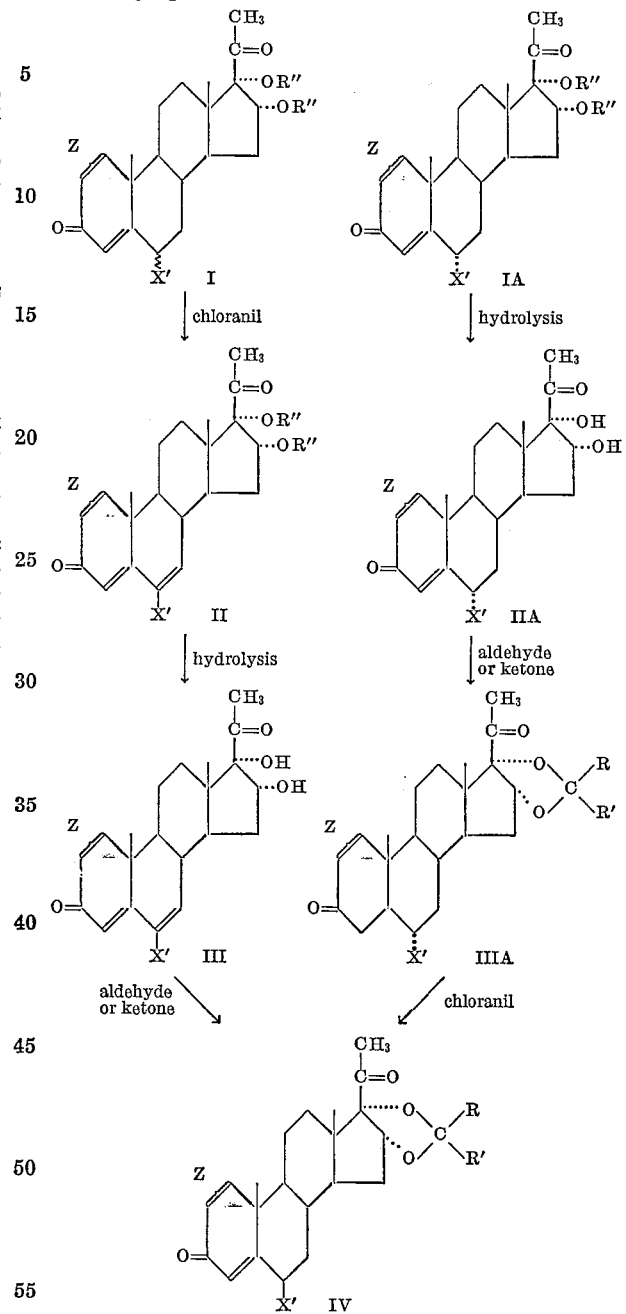

In the above formulas, Z, R and R' have the same meaning as previously set forth. X' represents fluorine or chlorine and R" represents an acyl group of a hydrocarbon carboxylic acid of up to 12 carbon atoms, saturated or unsaturated, of straight or branched chain, cyclic or mixed cyclic aliphatic, substituted or not by methoxy, halogen or other groups and include such esters as the acetates, propionates, butyrates, hemisuccinates, enanthates, caproates, benzoates, trimethylacetates, cyclopentylpropionates, phenylpropionates, acetoxypropionates and β-chloropropionates.

In practicing the process above outlined, a 16α,17α-diacyloxy-6(α or β)-halo(fluoro or chloro)-Δ⁴-pregnene-3,20-dione (I), with or without an additional double bond at C–1,2, disclosed in our copending application Ser. No. 56, filed on Jan. 4, 1960, which is a continuation-in-part of our copending application Ser. No. 807,774, filed on Apr. 21, 1959, is refluxed with chloranil in an inert solvent such as tertiary butanol, tertiary amyl alcohol, xylene, or a mixture of acetic acid and amyl acetate or of acetic acid and ethyl acetate, to form the corresponding 16α,17α-diacyloxy-6-halo(fluoro or chloro) - Δ$^{4,6}$ - pregnadiene-3 20-dione or 16α,17α-diacyloxy-6-halo(fluoro or chloro)-Δ$^{1,4,6}$-pregnatriene-3-20-dione (II).

The 16α,17α-diacyloxy-6-halo(fluoro or chloro)-Δ$^{4,6}$-pregnadiene-3,20-dione may be further dehydrogenated between C-1 and C-2 by refluxing with selenium dioxide, preferably in tertiary butanol and in the presence of catalytic amounts of pyridine and under an atmosphere of nitrogen.

The 16α,17α-diacyloxy groups are then hydrolyzed as by treatment with dilute methanolic potassium hydroxide at room temperature for one day. The resulting glycol (III) is reacted with a ketone or aldehyde such as acetone, formaldehyde, paraldehyde, acetaldehyde, benzophenone, acetophenone, methyl ethyl ketone, diethyl ketone and other similar aldehydes and ketones in the presence of an acid catalyst such as perchloric acid or hydrochloric acid to form the corresponding 16α,17α-cyclic ketal or 16α,17α-cyclic acetal.

Alternatively, a 6α-halo(fluoro or chloro)-16α,17α-diacyloxy-Δ$^4$-pregnene-3,20-dione or the 1-dehydro derivative thereof (IA) is hydrolyzed as with dilute methanolic potassium hydroxide, to form the glycol (IIA), which is then reacted with an aldehyde or ketone in the manner set forth previously to form the 16α,17α-cyclic acetal or 16α,17α-cyclic ketal. Treatment of the latter with chloranil in the manner set forth above produces the desired 16α,17α-cyclic acetal or 16α,17α-cyclic ketal of 6-halo-Δ$^{4,6}$-pregnadiene-3,20-dione or of the 1-dehydro derivative thereof (IV).

The novel 16α,17α-cyclic acetals and 16α,17α-ketals of 6 - halo - Δ$^4$-pregnene-16α,17α-diol-3,20-dione, with or without additional double bonds at C-1, 2 and/or C-6, 7, can also be prepared by the introduction of a halogen atom at C-6 of a 16α,17α-cyclic ketal or 16α,17α-cyclic acetal of 16α,17α-dihydroxy-progesterone and can be illustrated by the following equation:

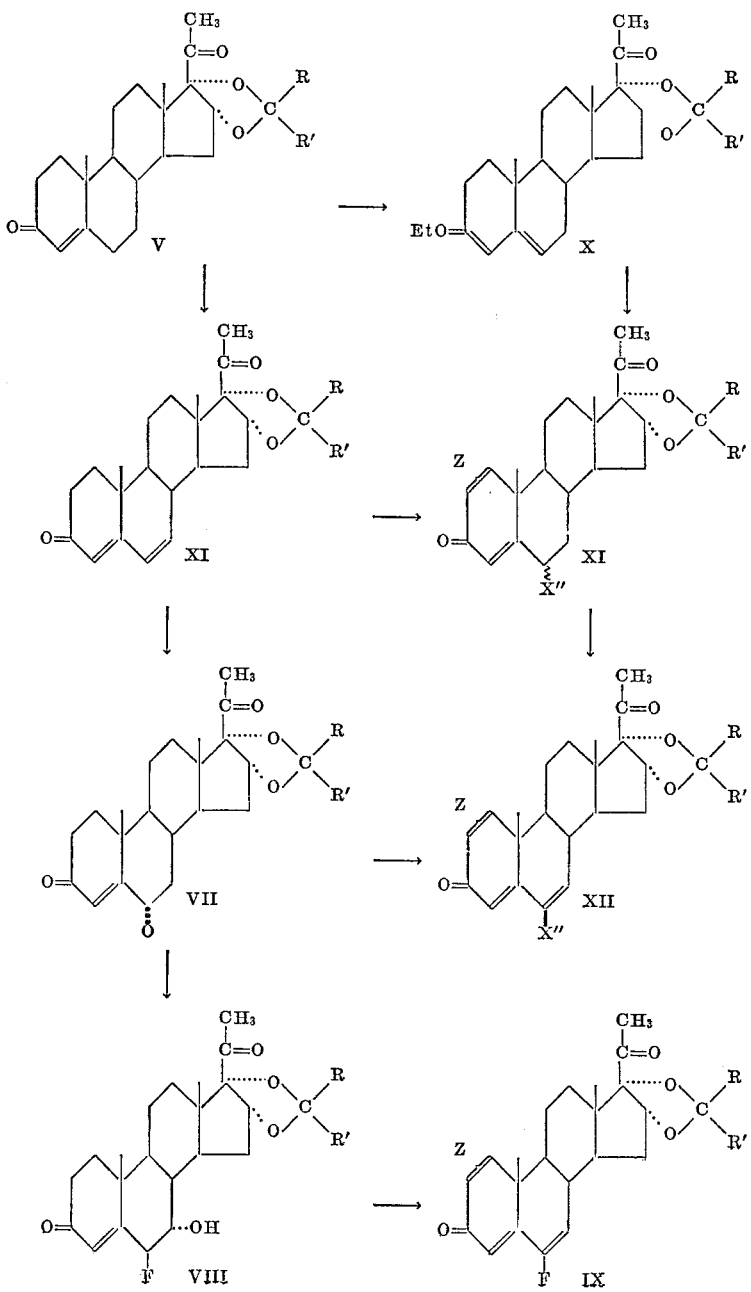

In the above formulas, Z, R, and R' have the same meaning as previously set forth and X" represents chlorine or bromine.

In practicing the process set out above, a 16α,17α-cyclic acetal or 16α,17α-cyclic ketal, preferably the acetonide, of 16α,17α-dihydroxy-progesterone (V), disclosed by Cooley et al., J. Chemi. Soc. 4373 (1955), is treated with chloranil in the manner described heretofore to form the corresponding 6-dehydro derivative (VI) which compounds per se have a marked progestational effect. The C-6, 7 double bond is then selectively epoxidized by reaction with a peracid and the resulting 16α,17α-ketal or acetal of 6α,7α-oxido-$\Delta^4$-pregnene-16α,17α-diol-3,20-dione (VII) is treated with hydrogen chloride or hydrogen bromide to produce the corresponding 16α,17α-cyclic ketal or acetal of 6-halo(chloro or bromo)-$\Delta^{4,6}$-pregnadiene-16α,17α-diol-3,20-dione (XII), wherein a third double bond at C-1, 2 is introduced by reaction with selenium dioxide to form the $\Delta^{1,4,6}$-pregnatriene compound.

Upon treatment of the 6α,7α-epoxide (VII) with boron trifluoride or anhydrous hydrogen fluoride at low temperature, there is formed the 16α,17α-cyclic ketal or acetal of 6β-fluoro-$\Delta$-pregnene-7α,16α,17α-triol-3,20-dione (VIII) which upon acid treatment with dry hydrogen chloride in acetone at low temperature is transformed into the 16α,17α-cyclic ketal or acetal of 6-fluoro-$\Delta^{4,6}$-pregnadiene-16α,17α-diol-3,20-dione (IX). Upon further treatment with selenium dioxide, the latter is converted into the 1-dehydro form.

The preparation of the novel 6-chloro or 6-bromo compound of the present invention may also be formed by reacting the 16α,17α-cyclic ketal or acetal of $\Delta^4$-pregnene-16α,17α-diol-3,20-dione with an alkyl orthoformate, preferably ethyl orthoformate, to produce the 3-ethyl enol ether (X). Upon reaction of the latter with hypochlorous acid or hypobromous acid, using for this reaction any reagent capable of generating such acids, such as N-chloro or N-bromo amides or imides, hypochlorites or hypobromites of alkali or alkaline earth metals, there is formed the 16α,17α-cyclic ketal or acetal of 6β-chloro or 6β-bromo-$\Delta^4$-pregnene-16α,17α-diol-3,20-dione (XI), which when treated with chloranil are transformed into the corresponding 6-dehydro compounds (XII). Upon reaction with selenium dioxide, there is introduced an additional double bond at C-1, 2 in compounds XI and XII, thus forming the cyclic ketal or acetal of 6β-chloro or 6β-bromo-$\Delta^{1,4}$-pregnadiene-16α,17α-diol-3,20-dione and of 6-chloro or 6-bromo-$\Delta^{1,4,6}$-pregnatriene-16α,17α-diol-3,20-dione.

By acid treatment of the 16α,17α-cyclic ketal or acetal of 6β-chloro or 6β-bromo-$\Delta^4$-pregnene-16α,17α-diol-3,20-dione or of their 1-dehydro derivatives, there are formed the corresponding 6α-chloro or 6α-bromo-isomers, which upon further reaction with chloranil are dehydrogenated at C-6,7 to thus form the 16α,17α-cyclic ketal or acetal of 6(chloro or bromo)-$\Delta^{4,6}$-pregnadiene-16α,17α-diol-3,20-dione (XII) and 6(chloro or bromo)-$\Delta^{1,4,6}$-pregnatriene-16α,17α-diol-3,20-dione.

In another aspect of the present invention, the novel 6-fluoro compounds may be prepared by ketalizing or acetalizing $\Delta^5$-pregnene-3β,16α,17α-triol-20-one, then epoxidizing the double bond to produce the 16α,17α-cyclic ketal or acetal of 5α,6α-oxido-pregnane-3β,16α,17α-triol-20-one. The latter is then treated with boron trifluoride or anhydrous hydrogen fluoride at low temperature to form the 16α,17α-cyclic ketal or acetal of 6β-fluoro-pregnane-3β,5α,16α,17α-tetrol-20-one, followed by oxidation of the 3β-hydroxyl group with 8 N chromic acid to the 3-keto group and then subsequent dehydration at C-5 by acid treatment, as with dry hydrogen chloride in acetone at low temperature, thus effecting the simultaneous inversion of the steric configuration at C-6. In this manner there are obtained the 16α,17α-cyclic ketal or acetal of 6α-fluoro-$\Delta^4$-pregnene-16α,17α-diol-3,20-dione which is then dehydrogenated at C-6,7 and/or C-1,2 as previously described. If the dehydration at C-5 is conducted with anhydrous hydrogen chloride at higher temperatures or in another solvent such as acetic acid, hydrolysis of the ketal or acetal group at C-16α,17α may occur followed by acetylation at C-16. Therefore, when using dry hydrogen chloride in acetic acid, the crude product is subjected to an alkaline treatment and the stop of ketalization or acetalization is repeated.

The following specific examples serve to illustrate but are not intended to limit the scope of the present invention:

EXAMPLE I

A mixture of 5 g. of the diacetate of 6α-chloro-$\Delta^4$-pregnene-16α,17α-diol-3,20-dione, 10 g. of chloranil and 100 cc. of tertiary butanol was refluxed under an atmosphere of nitrogen for 3 hours. The mixture was evaporated to dryness and the residue was extracted with 10 cc. of methylene chloride; the extract was washed with cold 5% sodium hydroxide solution until the washings were colorless, then with water to neutral, dried over anhydrous sodium sulfate and the solvent was evaporated. The residue consisted of the diacetate of 6-chloro-$\Delta^{4,6}$-pregnadiene-16α-17α-diol-3,20-dione which was then treated with 100 cc. of 1% methanolic potassium hydroxide solution for 24 hours at room temperature and under an atmosphere of nitrogen. It was then acidified with acetic acid, concentrated to a small volume under reduced pressure and the product was precipitated with water. There was thus obtained the free 6-chloro-$\Delta^{4,6}$-pregnadiene-16α,17α-diol-3,20-dione, which was purified by recrystallization from acetone-hexane.

A solution of 3 g. of the above compound in 40 cc. of acetone was treated with 0.4 cc. of 70% perchloric acid and stirred for 1 hour at room temperature, poured into 200 cc. of 1% aqueous sodium bicarbonate solution and the precipitate was collected by filtration, washed with water, dried and recrystallized from acetone-hexane. There was thus obtained the acetonide of 6-chloro-$\Delta^{4,6}$-pregnadiene-16α,17α-diol-3,20-dione.

A mixture of 2 g. of the above compound, 100 cc. of tertiary butanol, 500 mg. of selenium dioxide and a few drops of pyridine was refluxed for 18 hours under an atmosphere of nitrogen. It was filtered while hot through Celite, the filtrate was evaporated to dryness under reduced pressure, the residue was decolorized by refluxing with 100 cc. of acetone and 3 g. of decolorizing charcoal and the crude product was further purified by chromatography on neutral alumina. There was thus obtained the acetonide of 6-chloro-$\Delta^{1,4,6}$-pregnatriene-16α,17α-diol-3,20-dione.

EXAMPLE II

In the method of the preceding example the diacetate of 6α-chloro-$\Delta^4$-pregnene-16α,17α-diol-3,20-dione was substituted by its 6β-isomer, to produce the intermediate diacetate of 6-chloro-$\Delta^{4,6}$-pregnadiene-16α,17α-diol-3,20-dione with identical properties to those of the compound obtained in accordance with the method of Example I.

EXAMPLE III

A mixture of 5 g. of the diacetate of 6α-chloro-$\Delta^{1,4}$-pregnadiene-16α,17α-diol-3,20-dione, 10 g. of chloranil, 100 cc. of n-amyl acetate and 10 cc. of glacial acetic acid was refluxed for 16 hours. It was then washed with 5% aqueous sodium hydroxide solution until the washings were colorless, then with water to neutral, dried over anhydrous sodium sulfate and the solvent was evaporated under reduced pressure. The residue was purified by crystallization from acetone-hexane thus furnishing the diacetate of 6-chloro-$\Delta^{1,4,6}$-pregnatriene-16α,17α-diol-3,20-dione. In accordance with the method of Example I, there were hydrolyzed the acetoxy groups and then there was formed the 16,17-acetonide of 6-chloro-$\Delta^{1,4,6}$-pregnatriene- $16\alpha,17\alpha$-diol-3,20-dione, identical with the compound described in such example.

EXAMPLE IV

By following the method described in Example III, but substituting the diacetate of $6\alpha$-chloro-$\Delta^{1,4}$-pregnadiene-$16\alpha,17\alpha$-diol-3,20-dione by the diacetate of $6\alpha$-fluoro-$\Delta^4$-pregnene-$16\alpha,17\alpha$-diol-3,20-dione, there was obtained in the reaction with chloranil the diacetate of 6-fluoro-$\Delta^{4,6}$-pregnadiene-$16\alpha,17\alpha$-diol-3,20-dione; the acetoxy groups were hydrolyzed and finally there was formed the acetonide of 6 - fluoro - $\Delta^{4,6}$ - pregnadiene-$16\alpha,17\alpha$-diol-3,20-dione; by subsequent oxidation with selenium dioxide (cf. Example I) there was obtained the acetonide of 6-fluoro-$\Delta^{1,4,6}$-pregnatriene-$16\alpha,17\alpha$-diol-3,20-dione.

EXAMPLE V

In accordance with the method of Example III, the diacetate of $6\beta$-fluoro-$\Delta^{1,4}$-pregnadiene-$16\alpha,17\alpha$-diol-3,20-dione was converted into that of 6-fluoro-$\Delta^{1,4,6}$-pregnatriene-$16\alpha,17\alpha$-diol-3,20-dione, and then there was prepared the compound with the free hydroxyl groups.

A solution of 3 g. of 6 - fluoro - $\Delta^{1,4,6}$ - pregnatriene-$16\alpha,17\alpha$-diol-3,20-dione in 100 cc. of benzene and 10 g. of paraformaldehyde was treated with 500 mg. of 70% perchloric acid and stirred for 2 hours at room temperature; the benzene solution was then washed with 5% aqueous sodium bicarbonate solution and then with water to neutral, dried over anhydrous sodium sulfate and the solvent was evaporated. Chromatography of the residue on neutral alumina afforded 6-fluoro-$16\alpha,17\alpha$-methylenedioxy-$\Delta^{1,4,6}$-pregnatriene-3,20-dione, namely the formaldehyde-acetal of 6-fluoro-$\Delta^{1,4,6}$-pregnatriene-$16\alpha,17\alpha$-diol-3,20-dione.

EXAMPLE VI

A solution of 5 g. of $6\alpha$-fluoro-$16\alpha,17\alpha$-diacetoxy-$\Delta^4$-pregnene-3,20-dione in 500 cc. of 0.1% methanolic potassium hydroxide solution was kept at 0° C. for 8 days; it was then acidified with acetic acid, concentrated to a small volume, diluted with water and the precipitate formed was collected, washed with water and air dried, thus giving the crude $6\alpha$-fluoro-$\Delta^4$-pregnene-$16\alpha,17\alpha$-diol-3,20 dione; it was then treated with acetone in the presence of perchloric acid, exactly as described in Example I, thus affording the acetonide of $6\alpha$ - fluoro - $\Delta^4$ - pregnene-$16\alpha,17\alpha$-diol-3,20-dione.

There was introduced an additional double bond at C-6,7 of the above compound, in accordance with the method of Example I, by the reaction with chloranil, and thus there was obtained the acetonide of 6-fluoro-$\Delta^{4,6}$-pregnadiene-$16\alpha,17\alpha$-diol-3,20-dione, identical with the compound described in Example IV.

EXAMPLE VII

In accordance with the method of the preceding example, there were hydrolyzed the ester groups of the diacetate of $6\alpha$-chloro-$\Delta^{1,4}$-pregnadiene-$16\alpha,17\alpha$-diol-3,20-dione, the acetonide was formed of the resulting $6\alpha$-chloro-$\Delta^{1,4}$-pregnadiene-$16\alpha,17\alpha$-diol-3,20-dione and finally the third double bond was introduced by the reaction with chloranil (cf. Example III) to produce the acetonide of 6-chloro-$\Delta^{1,4,6}$-pregnatriene-$16\alpha,17\alpha$-diol-3,20-dione; identical with the compound described in Example I.

EXAMPLE VIII

By hydrolysis of 5 g. of $6\alpha$-fluoro-$16\alpha,17\alpha$-diacetoxy-$\Delta^{1,4}$-pregnadiene-3,20-dione, in accordance with the method of Example VI, there was obtained $6\alpha$-fluoro-$\Delta^{1,4}$-pregnadiene-$16\alpha,17\alpha$-diol-3,20-dione. A mixture of 3 g. of this compound, 70 cc. of benzaldehyde, and 500 mg. of 70% perchloric acid was stirred for 6 hours, then washed with aqueous sodium bicarbonate solution and water to neutral, the excess of benzaldehyde was evaporated under reduced pressure and the residue was purified by chromatography on neutral alumina, thus yielding $6\alpha$-fluoro-$16\alpha,17\alpha$-benzylidenedioxy-$\Delta^{1,4}$-pregnadiene-3,20-dione. By subsequent reflux with chloranil, essentially following the procedure described in Example III, there was obtained 6 - fluoro - $16\alpha,17\alpha$ - benzylidenedioxy - $\Delta^{1,4,6}$ - pregnatriene-3,20-dione, namely the benzaldehydeacetal of 6-fluoro-$\Delta^{1,4,6}$-pregnatriene-$16\alpha,17\alpha$-diol-3,20-dione.

In a similar manner as set forth above but employing acetone instead of the benzaldehyde, there was prepared the corresponding $6\alpha$-fluoro-$16\alpha,17\alpha$-isopropylidenedioxy-$\Delta^{1,4}$-pregnadiene-3,20-dione, which upon subsequent reflux with chloranil was converted into 6-fluoro-$16\alpha,17\alpha$-isopropylidenedioxy-$\Delta^{1,4,6}$-pregnatriene-3,20-dione.

EXAMPLE IX

By following an analogous procedure to that described in Example I, there was prepared instead of the acetonide the 16,17-cyclohexanone-ketal, by substituting the acetone by cyclohexanone and extending the reaction time to 6 hours. Upon subsequent reflux of 2 g. of the resulting 6 - chloro - $16\alpha,17\alpha$ - cyclohexyldioxy - $\Delta^{4,6}$ - pregnadiene-3,20-dione with selenium dioxide, also in accordance with the procedure described in Example I, there was obtained 6 - chloro - $16\alpha,17\alpha$ - cyclohexyldioxy - $\Delta^{1,4,6}$ - pregnatriene-3,20-dione, namely the 16,17-cyclohexanone-ketal of 6-chloro-$\Delta^{1,4,6}$-pregnatriene-$16\alpha,17\alpha$-diol-3,20-dione.

EXAMPLE X

In accordance with the method described in Example I, 10 g. of $16\alpha,17\alpha$-isopropylidenedioxy-$\Delta^4$-pregnene-3,20-dione was treated with chloranil to produce $16\alpha,17\alpha$-isopropylidenedioxy-$\Delta^{4,6}$-pregnadiene-3,20-dione.

A solution of 7.5 g. of the above compound in 500 cc. of methylene chloride was mixed with 300 cc. of a 5% ether solution of monoperphthalic acid and the mixture was kept at room temperature for 24 hours. It was then washed with 5% aqueous sodium carbonate solution and water, dried over anhydrous sodium sulfate and concentrated until crystallization started. After cooling, the precipitate was collected, washed with water and air dried; by subsequent chromatography on neutral alumina there was obtained the acetonide of $6\alpha,7\alpha$-oxido-$\Delta^4$-pregnene-$16\alpha,17\alpha$-diol-3,20-dione.

To 150 cc. of a saturated solution of the dry hydrogen chloride in acetone was added at O° C., 5 g. of the acetonide of $6\alpha,7\alpha$-oxido-$\Delta^4$-pregnene-$16\alpha,17\alpha$-diol-3,20-dione and the mixture was kept at O° C. for 1 hour. It was then diluted with water and the precipitate was collected by filtration, washed with water, dried and recrystallized from acetone-hexane, thus furnishing the acetonide of 6-chloro-$\Delta^{4,6}$-pregnadiene - $16\alpha,17\alpha$ - diol-3,20-dione, identical with the one described in Example I.

EXAMPLE XI

In accordance with the method described in the preceding example, there was prepared 5 g. of the acetonide of $6\alpha,7\alpha$-oxido-$\Delta^4$-pregnene-$16\alpha,17\alpha$-diol-3,20-dione which was then treated with a saturated solution of dry hydrogen bromide in acetone, instead of hydrogen chloride solution. There was thus obtained the acetonide of 6-bromo-$\Delta^{4,6}$-pregnadiene-$16,\alpha,17\alpha$-diol-3,20-dione. By subsequent reaction with selenium dioxide, in accordance with the method of Example I, there was obtained the acetonide of 6-bromo-$\Delta^{1,4,6}$-pregnatriene-$16\alpha,$-$17\alpha$-diol-3,20-dione.

EXAMPLE XII

In accordance with the method described in Example X, there was prepared 5 g. of the acetonide of $6\alpha,7\alpha$-oxido-$\Delta^4$-pregnene-$16\alpha,17\alpha$-diol-3,20-dione, which was dissolved in 400 cc. of anhydrous chloroform, cooled to −70° C. in a Dry Ice-acetone bath and treated with a mixture of 12 cc. of anhydrous tetrahydrofurane and 9 g. of dry hydrogen fluoride, little by little and with stirring. The mixture was allowed to reach room temperature and kept there for 20 hours; it was then poured into 2 l. of 5% aqueous sodium carbonate solution mixed with ice, with vigorous stirring; the chloroform layer was separated, the aqueous phase was extracted with methylene chloride and the organic solutions were combined, washed with water to neutral, dried over anhydrous sodium sulfate and evaporated to dryness. Chromatography of the residue on silica gel yielded the acetonide of 6β-fluoro- Δ⁴-pregnene-7α,16α,17α-triol-3,20-dione.

A solution of 3 g. of the above compound in 100 cc. of acetone was treated with 50 cc. of a 30% solution of dry hydrogen chloride in acetone and kept for 18 hours at 0–5° C. The product was then isolated as described in Example X for the reaction with hydrogen chloride to produce the acetonide of 6-fluoro-Δ⁴,⁶-pregnadiene-16α,17α-diol-3,20-dione, identical with the compound mentioned in Example IV.

EXAMPLE XIII

In another experiment, 3 g. of the acetonide of 6α,7α-oxido-Δ⁴-pregnene-16α,17α-diol-3,20-dione (see Example X) was treated with 3 cc. of boron trifluoride etherate in 300 cc. of a mixture of equal parts of ether and benzene, at room temperature for 3 hours; the mixture was washed with water, then with aqueous saturated sodium bicarbonate solution, dried over anhydrous sodium sulfate and the solvent was evaporated. Chromatography of the residue furnished the acetonide of 6β-fluoro-Δ⁴-pregnene-7α,16α,17α-triol-3,20-dione, identical with the intermediate mentioned in the preceding example.

A slow stream of dry hydrogen chloride was introduced for 24 hours into a solution of 2 g. of the above compound in 100 cc. of glacial acetic acid, maintaining the temperature at 15° C. After diluting with water the precipitate formed was collected, subjected to a treatment with potassium hydroxide in accordance with Example I, and redissolved in 50 cc. of acetone; the solution was then treated with 200 mg. of perchloric acid, kept at room temperature for half an hour and the product was isolated by the method described in such example; there was thus obtained the acetonide of 6-fluoro-Δ⁴,⁶-pregnadiene-16α,17α-diol-3,20-dione, identical with the final compound of the preceding example.

EXAMPLE XIV

A solution of 5 g. of the acetonide of Δ⁴-pregnene-16α,17α-diol-3,20-dione, described by Cooley et al., J. Chem. Soc. 4373 (1955), in 30 cc. of dioxane was treated with 5 cc. of ethyl orthoformate and 500 mg. of p-toluenesulfonic acid and the mixture was stirred at room temperature for 75 minutes. 2 cc. of pyridine and 30 cc. of water were added and the precipitate was collected and purified by recrystallization from methanol-water, thus affording 3-ethoxy-16α,17α-isopropylidenedioxy-Δ³,⁵-pregnadien-20-one.

A mixture of 5 g. of the above compound, 100 cc. of acetone, 20 cc. of water and 2 g. of sodium acetate was cooled to 0° C., treated with 2 g. of N-chlorosuccinimide followed by 2 cc. of glacial acetic acid, stirred at 0° C. for 1 hour, poured into water and the precipitate was collected, washed with water, dried and recrystallized from acetone-hexane. There was thus obtained the acetonide of 6β-chloro-Δ⁴-pregnene-16α,17α-diol-3,20-dione.

By subsequent treatment with dry hydrogen chloride in acetone for 30 minutes at 0° C. there was obtained the acetonide for 6α-chloro-Δ⁴-pregnene-16α,17α-diol-3,20-dione.

EXAMPLE XV

In the method of the preceding example there was substituted the N-chlorosuccinimide by N-bromosuccinimide and thus there was obtained the acetonides of 6β-bromo-Δ⁴-pregnene-16α,17α-diol-3,20-dione and of 6α-bromo-Δ⁴-pregnene-16α,17α-diol-3,20-dione, respectively. By reaction with chloranil of either of the two preceding compounds there was then obtained the acetonide of 6-bromo-Δ⁴,⁶-pregnadiene-16α,17α-diol-3,20 - dione which was converted into the acetonide of 6-bromo-Δ¹,⁴,⁶-pregnatriene-16α,17α-diol-3,20-dione by reaction with selenium dioxide; for the dehydrogenation there was used the procedure described in Example I.

By conducting the reaction with selenium dioxide prior to the reaction with chloranil, there was obtained the acetonides of 6β-bromo-Δ¹,⁴-pregnadiene-16α,17α-diol-3,20-dione and of 6α-bromo-Δ¹,⁴-pregnadiene-16α,17α-diol-3,20-dione.

EXAMPLE XVI

An acetone solution of 5 g. of Δ⁵-pregnene-3β,16α-17α-triol-20-one (Romo and Vivar, J. Org. Chem., 21, 902 (1956)) was treated with perchloric acid as described in Example I to produce the acetonide of Δ⁵-pregnene-3β,16α,17α-triol-20-one.

A solution of 5 g. of the above compound in 100 cc. of chloroform was treated with an ether solution of monoperphthalic acid containing 1.2 molar equivalents of the peracid and the mixture was kept at room temperature and in the dark for 24 hours. It was then diluted with water and the organic layer was separated, washed with water, dried over anhydrous sodium sulfate and the solvent was evaporated. Chromatography of the residue on neutral alumina afforded the acetonide of 5α,6α-oxido-pregnane-3β,16α-triol-20-one.

4 g. of the above compound was subjected to the reaction with boron trifluoride etherate (cf. Example XIII) to give the 16, 17-acetonide of 6β-fluoro-pregnane-3β,5β,16α,17α-tetrol-20-one (in another experiment this compound was obtained by reaction with dry hydrogen fluoride, in accordance with the method described in Example XII).

A solution of 3 g. of the above compound in 150 cc. of acetone was cooled to 0° C., flushed with nitrogen and slowly treated with an 8 N solution of chromic acid, under stirring, until the color of chromium trioxide persisted in the mixture (the 8 N solution of chromic acid had been prepared by dissolving 26.7 g. of chromium trioxide in 23 cc. of concentrated sulfuric acid and diluting with water to 100 cc.). The mixture was then stirred at 0° C. under an atmosphere of nitrogen for 5 minutes further and the product was precipitated by the addition of water; the precipitate was washed with water, dried and recrystallized from acetone-hexane, thus furnishing the acetonide of 6β-fluoro-pregnane-5α,16α,17α-triol-3,20-dione.

2 g. of the above compound was treated with dry hydrogen chloride in acetone at 0° C. for 2 hours and the product was then isolated by diluting with water, filtering the precipitate and recrystallizing. There was thus obtained the 16,17-acetonide of 6α-fluoroΔ⁴-pregnene-16α,17α-diol-3,20-dione, identical with the compound mentioned in Example VI.

We claim:

1. A compound of the following formula:

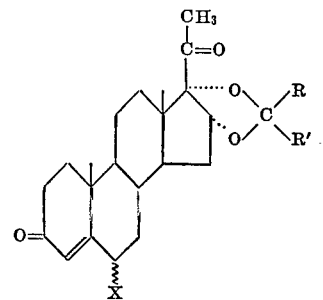

wherein X is selected from the group consisting of fluorine, chlorine and bromine; and R and R' are each selected from the group consisting of hydrogen and a hydrocarbon radical containing up to 8 carbon atoms.

2. The 16α,17α-acetonide of 6α-fluoro-Δ⁴-pregnene-16α,17α-diol-3,20-dione.

3. The 16α,17α-acetonide of 6β-chloroΔ⁴-pregnene-16α,17α-diol-3,20-dione.

4. The 16α,17α-acetonide of 6α-chloro-Δ⁴-pregnene-16α17α-diol-3,20-dione.

5. The 16α,17α-acetonide of 6β-bromo-Δ⁴-pregnene-16α,17α-diol-3,20-dione.

6. The 16α,17α-acetonide of 6α-bromo-Δ⁴-pregnene-16α,17α-diol-3,20-dione.

7. A compound of the following formula:

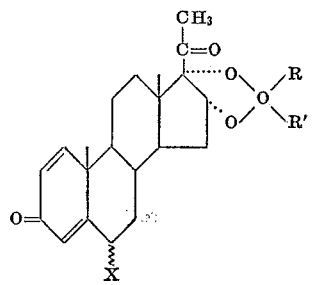

wherein X is selected from the group consisting of fluorine, chlorine and bromine; and R and R' are each selected from the group consisting of hydrogen and a hydrocarbon radical containing up to 8 carbon atoms.

8. The 16α,17α-acetonide of 6α-fluoro-Δ¹,⁴-pregnadiene-16α,17α-diol-3,20-dione.

9. The 16α,17α-acetonide of 6α-bromo-Δ¹,⁴-pregnadiene-16α,17α-diol-3,20-dione.

10. The 16α,17α-acetonide of 6α-chloro-Δ¹,⁴-pregnadiene-16α,17α-diol-3,20-dione.

11. 6α - fluoro-16α,17α - benzylidenedioxy-Δ¹,⁴-pregnadiene-3,20-dione.

12. A compound of the following formula:

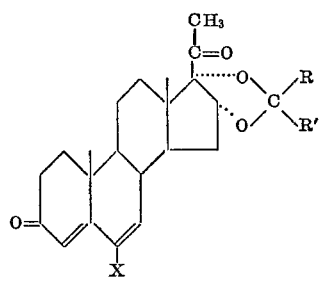

wherein X is selected from the group consisting of fluorine, chlorine and bromine; and R and R' are each selected from the group consisting of hydrogen and a hydrocarbon radical containing up to 8 carbon atoms.

13. The 16α,17α-acetonide of 6-chloro-Δ⁴,⁶-pregnadiene-16α,17α-diol-3,20-dione.

14. The 16α,17α-acetonide of 6-fluoro-Δ⁴,⁶-pregnadiene-16α,17α-diol-3,20-dione.

15. The 16α,17α-cyclohexanone ketal of 6-chloro-Δ⁴,⁶-pregnadiene-16α,17α-diol-3,20-dione.

16. The 16α,17α-acetonide of 6-bromi-Δ⁴,⁶-pregnadiene-16α,17α-diol-3,20-dione.

17. A compound of the following formula:

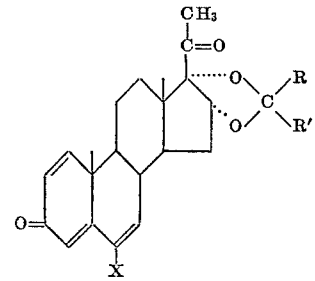

wherein X is selected from the group consisting of fluorine, chlorine and bromine; and R and R' are each selected from the group consisting of hydrogen and a hydrocarbon radical containing up to 8 carbon atoms.

18. The 16α,17α-acetonide of 6-chloro-Δ¹,⁴,⁶-pregnatriene-16α,17α-diol-3,20-dione.

19. The 16α,17α-acetonide of 6-fluoro-Δ¹,⁴,⁶-pregnatriene-16α,17α-diol-3,20-dione.

20. 6 - fluoro - 16α,17α - methylenedioxy-Δ¹,⁴,⁶-pregnatriene-3,20-dione.

21. 6-fluoro - 16α,17α-benzylidenedioxy-Δ¹,⁴,⁶-pregnatriene-3,.0-dione.

22. The cyclohexanone ketal of 6-chloro-Δ¹,⁴,⁶-pregnatrien-16α,17α-diol-3,20-dione.

23. The acetonide of 6-bromo-Δ¹,⁴,⁶-pregnatriene-16α,17α-diol-3,20-dione.

24. The acetonide of Δ⁴,⁶-pregnadiene-16α,17α-diol-3,20-dione.

25. A compound of the formula:

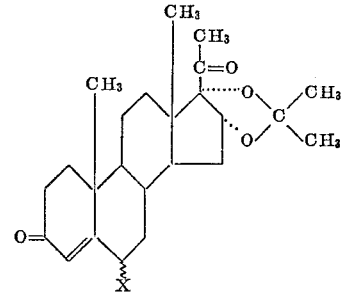

wherein X is selected from the group consisting of alpha-fluoro, alpha-chloro, and beta-chloro.

26. A compound of the formula:

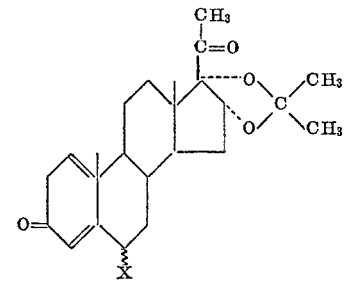

wherein X is selected from the group consisting of fluorine chlorine and bromine.

27. A compound selected from the group consisting of steroids of the general formula:

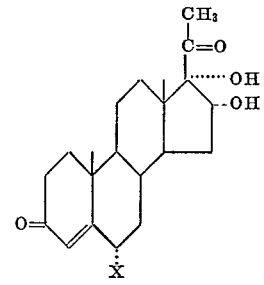

and the 1-dehydro derivatives thereof wherein X is selected frof the group consisting of chlorine and fluorine.

28. Compounds of the formula:

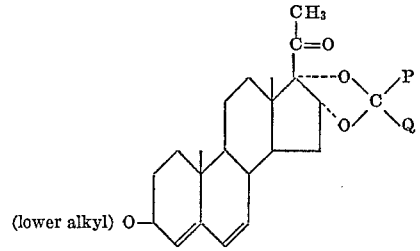

where P and Q are individually selected from the group consisting of hydrogen, lower alkyl, halogenated lower alkyl, monocyclic cycloalkyl, monocyclic aryl, monocyclic aryl lower alkyl, monocyclic heterocyclic, and together with the carbon atom to which P and Q are joined cycloalkyl and monocyclic heterocyclic.

29. 3-ethoxy-Δ³,⁵-pregnadiene-16α,17α-diol-20-one 16α,17α-acetonide.

30. 16α,17α-acetophenone derivative of 3-ethoxy-Δ³,⁵-pregnadiene-16α,17α-diol-20-one.

31. A compound of the formula:

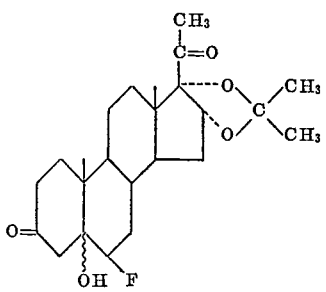

32. a compound of the formula:

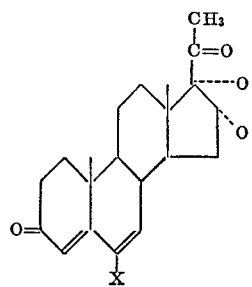

wherein X is selected from the group consisting of chloro and fluoro.

33. A compound of the formula:

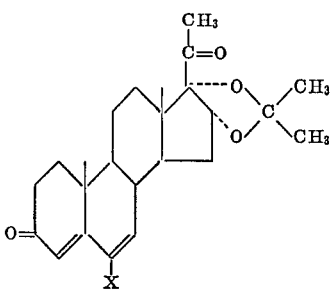

wherein X is selected from the group consisting of chloro, bromo and fluoro.

34. 6-halo - Δ¹,⁴,⁶-pregnatriene-16α,17α-diol-3,20-dione 16,17-acetonide.

35. 6-halo - Δ¹,⁴,⁶-pregnatriene-16α,17α-diol-3,20-dione 16,17-acetophenonide.

36. 6-fluoro- Δ¹,⁴,⁶-pregnatriene-16α,17α-diol-3,20-dione 16,17-acetophenonide.

References Cited

UNITED STATES PATENTS

| | | | |
|---|---|---|---|
| 2,837,464 | 6/1958 | Nobile | 260—397.4 |
| 2,838,500 | 6/1958 | Campbell et al. | 260—239.55 |
| 2,838,542 | 6/1958 | Spero et al. | 260—397.45 |
| 2,838,548 | 6/1958 | Magerlein et al. | 260—397.45 |
| 2,941,997 | 6/1960 | Fried | 260—239.55 |

OTHER REFERENCES

Mills et al.: J.A.C.S., 81, 1264–5 (1959).

ELBERT L. ROBERTS, *Primary Examiner.*

U.S. Cl. X.R.
260—397.4, 999

UNITED STATES PATENT OFFICE
CERTIFICATE OF CORRECTION

Patent No. 3,445,462    Dated May 20, 1969

Inventor(s) Howard J. Ringold and George Rosenkranz

It is certified that error appears in the above-identified patent and that said Letters Patent are hereby corrected as shown below:

Column 4, after line 22, as the designation for the formula in the left column, second from the top, cancel "XI" and replace with --VI--.

Column 4, after line 22, in the second row of formulas from the top, cancel the arrow between Formulas VI and XI.

Column 4, after line 22, in the third row of formulas from the top, Formula VII should appear as follows:

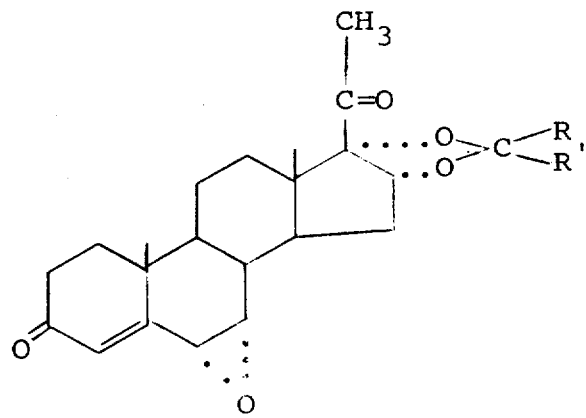

Column 5, line 24, cancel "∧" and replace with --∧$^4$--.

Column 6, line 8, cancel "stop" and replace with --step--.

Column 6, line 18, cancel "10" and replace with --100--.

continued.....

UNITED STATES PATENT OFFICE
CERTIFICATE OF CORRECTION

Patent No. 3,445,462              Dated May 20, 1969

Inventor(s) Howard J. Ringold and George Rozenkranz

It is certified that error appears in the above-identified patent and that said Letters Patent are hereby corrected as shown below:

Column 6, line 24, cancel "16α-17α" and replace with --16α,17α--.

Column 8, line 60, cancel "16,α," and replace with --16α,--.

Column 10, line 10, cancel "16α-17α" and replace with 16α,17α--.

Column 10, line 24, after "16α" and before "-triol", insert --,17α--.

Column 10, line 28, cancel "5β" and replace with --5α--.

Column 11, line 55, in Claim 16, cancel "bromi" and replace with --bromo--.

Column 12, line 6, in Claim 21, cancel ".0" and replace with --20--.

continued.......

UNITED STATES PATENT OFFICE
CERTIFICATE OF CORRECTION

Patent No. 3,445,462        Dated  May 20, 1969

Inventor(s)  Howard J. Ringold and George Rosenkranz

It is certified that error appears in the above-identified patent and that said Letters Patent are hereby corrected as shown below:

Column 12, lines 30 to 40, the formula for Claim 26 should appear as follows:

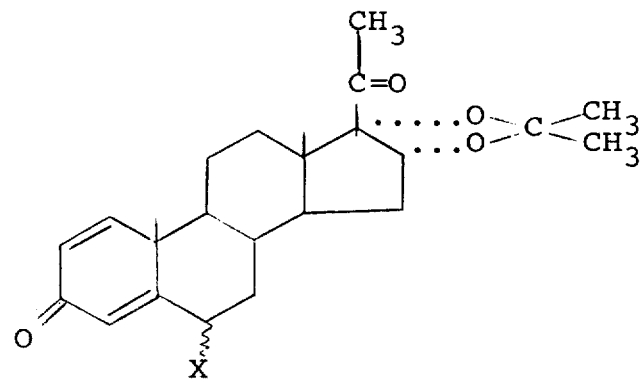

Column 13, lines 10 to 20, the formula for Claim 31 should appear as follows:

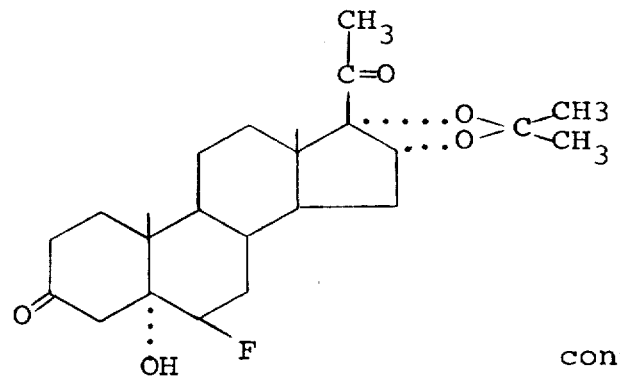

continued

UNITED STATES PATENT OFFICE
CERTIFICATE OF CORRECTION

Patent No. 3,445,462          Dated May 20, 1969

Inventor(s) Howard J. Ringold and George Rosenkranz

It is certified that error appears in the above-identified patent and that said Letters Patent are hereby corrected as shown below:

Column 13, lines 25 to 30, the formula for Claim 32 should appear as follows:

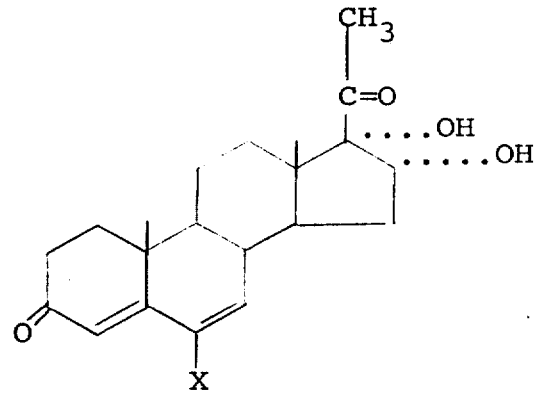

SIGNED AND SEALED
JUN 9 1970

(SEAL)
Attest:

Edward M. Fletcher, Jr.
Attesting Officer

WILLIAM E. SCHUYLER, JR.
Commissioner of Patents